United States Patent [19]

Intille

[11] 4,229,188
[45] Oct. 21, 1980

[54] SELECTIVE ADSORPTION PROCESS

[75] Inventor: George M. Intille, Randolph, N.J.

[73] Assignee: Monsanto Company, St. Louis, Mo.

[21] Appl. No.: 49,515

[22] Filed: Jun. 18, 1979

[51] Int. Cl.³ .................... B01D 53/04; B01D 53/22
[52] U.S. Cl. ........................................ 55/16; 55/62;
55/66; 55/74
[58] Field of Search ............... 55/16, 25, 26, 58, 62,
55/66, 68, 74, 75, 158, 179, 374, 375

[56] References Cited
U.S. PATENT DOCUMENTS

| | | | |
|---|---|---|---|
| 3,141,748 | 7/1964 | Hoke et al. | 55/25 |
| 3,142,547 | 7/1964 | Marsh et al. | 55/26 |
| 3,336,730 | 8/1967 | McBride et al. | 55/16 |
| 3,430,418 | 3/1969 | Wagner | 55/25 |
| 3,702,525 | 11/1972 | Simon et al. | 55/25 |
| 3,838,553 | 10/1974 | Doherty | 55/66 X |
| 4,171,207 | 10/1979 | Sircar | 55/26 |
| 4,180,552 | 12/1979 | Graham et al. | 55/16 X |
| 4,181,675 | 1/1980 | Makin et al. | 55/16 X |

OTHER PUBLICATIONS

Hydrocarbon Processing, Jul. 1977, pp. 147-152, vol. 56, No. 7, "Cryogenics Increase Benzene Recovery".

Primary Examiner—Robert H. Spitzer
Attorney, Agent, or Firm—Thomas B. Leslie; J. W. Williams, Jr.

[57] ABSTRACT

There is provided an improved, environmentally acceptable adsorption process for the recovery of hydrogen and normally liquid hydrocarbon from a feed gas mixture by utilizing a membrane permeator unit selectively permeable to hydrogen to recover a permeated hydrogen gas from the purge gas obtained from the regeneration of a selective adsorption unit, recycling the permeated hydrogen gas to a guard adsorber of the selective adsorption unit as purge gas and blending said gas with the feed gas mixture for recovery of normally liquid hydrocarbon and of the added proportion of hydrogen as purified hydrogen product.

27 Claims, 1 Drawing Figure

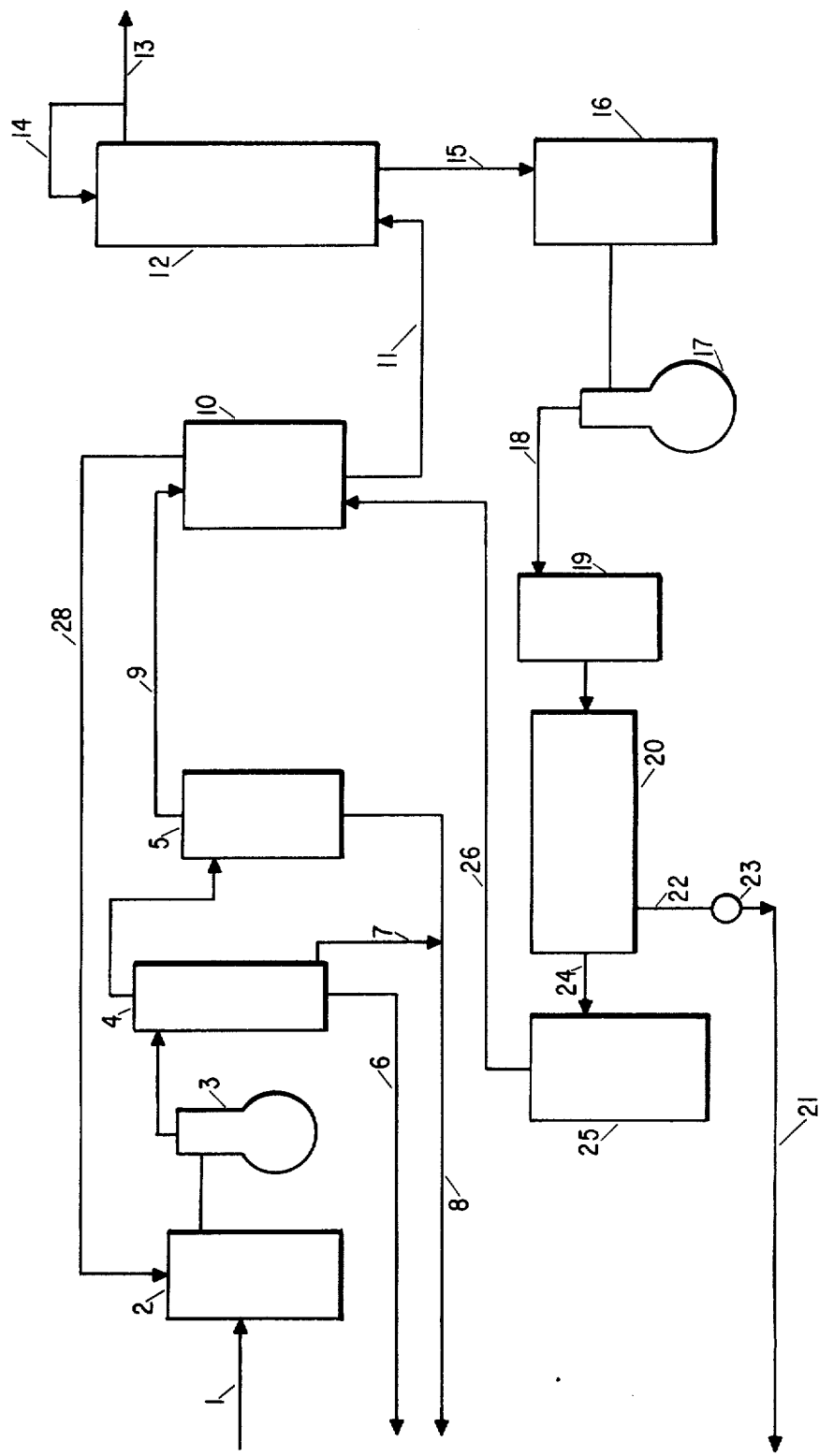

SELECTIVE ADSORPTION PROCESS

BACKGROUND OF THE INVENTION

This invention relates to a process for the separation of components of gaseous mixtures, and particularly relates to an improved selective adsorption process for the separation of high purity light gases, especially hydrogen or helium.

Cyclic swing adsorption or pressure swing adsorption hereinafter referred to as selective adsorption has been widely used for the recovery of lighter, less sorbed gases from a mixture with one or more heavier, more readily adsorbed gases.

The light gas desired in relatively more purified form is frequently hydrogen. Such hydrogen may be recovered from various hydrogen-containing gas mixtures such as purge streams from various synthesis processes involving hydrogen as a reactant, such as hydrogenations, synthesis of hydrocarbons, or as a product or by-product, such as dehydrogenation reactions as well as streams produced by the controlled combustion or reforming of hydrocarbons or from cracking of hydrocarbon feedstock. Another light gas which also is recovered in more purified form by the use of selective adsorption is helium which can be recovered from helium-containing natural gas compositions.

Selective adsorption systems generally involve passage of the feed gas mixtures through equipment comprising two or more adsorbers containing beds of molecular sieves or other adsorbents for the heavier components of the gas mixture. The selective adsorbers are arranged to operate in sequence with suitable lines, valves, timers and the like so there are established an adsorption period during which the heavier components of the feed gas mixture are adsorbed on the molecular sieve or other adsorbent, and a regeneration period during which the heavier components are desorbed and purged from the adsorbent to regenerate it for reuse. The widely used cyclic pressure processes provide a repressuring period during which the adsorber is brought substantially to adsorption period pressure. There are frequently added one or more guard adsorbers upstream from the primary selective adsorbers containing an adsorbent or adsorbents, which may differ from the primary adsorbent, used to adsorb any unusually heavy contaminants in a feed gas mixture which might tend to inactivate the primary adsorbent or render it difficult to regenerate, including such as vapors of normally liquid hydrocarbon and the like. The regeneration or purging of the primary selective adsorbers and the guard adsorbers in earlier selective adsorption processes was generally carried out by recycling at a lower pressure a part of the product stream of purified light gas.

Such processes of selective adsorption have been widely described in the literature and are familiar to those skilled in the art. Although these selective adsorption processes are effective to produce a relatively highly purified light gas product, they suffer from disadvantages. The greatest disadvantage is the relatively low percentage recoveries which are generally encountered when a substantial part of the light gas product is used for the regeneration of the primary adsorbers and/or guard adsorbers.

Recoveries of hydrogen gas generally range from about 50 to about 80%. A further disadvantage is the fact that the substantial portion of the light gas product used for purging and regeneration of the primary adsorbers and guard adsorbers cannot be economically recovered from the regenerating gas mixtures and such mixtures including the components separated by the guard adsorbers and primary adsorbers are generally disposed of by venting, flaring or employing as low grade fuels. Thus, any part of process reactants or products carried as vapors and adsorbed onto the guard adsorbers is lost to the principal process by the usual operation of the selective adsorption processes.

Subsequently improved selective adsorption processes have been suggested wherein the regeneration of the selective adsorbers and/or guard adsorbers employ a portion of the substantially purified void space light gas from a selective adsorber whose adsorptive capacity has not been fully occupied by adsorbed heavier components, but a portion of which adsorbent pores or "void space" is occupied by purified light gas, particularly that portion of the adsorbent at the downstream end of the adsorber. Such substantially purified light gas for regeneration can be stored in a separate vessel as taught by U.S. Pat. No. 3,142,547 of Marsh et al., or it can be used directly in a system of four or more sequenced selective adsorbers as taught by U.S. Pat. No. 3,430,418 of Wagner. Although such improved selective adsorption processes have reduced the amount of purified light gas product used for regeneration and repressuring and have increased the recoveries of the desired light gas product, the light gas disposed of along with the desorbed and purged components represents loss of desired product. In particular, any substantially purified light gas used to purge and regenerate the guard adsorbers by desorbing and purging the adsorbed heavier hydrocarbons is generally not recoverable and must be disposed of. Moreover when vented or flared these heavier hydrocarbons frequently represent vapors which are undesirable from the aspect of air pollution. Thus, further improved recoveries of purified light gas product and of the heavier, normally liquid aliphatic or aromatic hydrocarbons are desired.

It has also been suggested to employ a low temperature separator unit in conjunction with a pressure swing adsorption unit with recompression of the regenerating gas from the adsorbers and recycle to the low temperature separator unit as taught by U.S. Pat. No. 3,838,553 of Doherty. Such systems are complicated and costly, requiring an attendant refrigeration system for operation of the low temperature separation unit. Hence, such systems have not been widely used.

There has now been developed a selective adsorption process which produces a high purity hydrogen product and a high yield of such gas from feed gas mixture or mixtures containing hydrogen, and additionally provides for recovery of the guard adsorber purge gas and its content of hydrocarbon reactant or product. The process involves the use of a recovery system comprising a hydrogen selective permeator and a selective adsorption unit with recycle of a substantial portion of the regenerating hydrogen which is separated by the permeator unit to a guard adsorber of the selective adsorption unit and recovery thereof as added product hydrogen as well as recovery of hydrocarbon reactant and/or product adsorbed by the guard adsorber.

SUMMARY

In accordance with the invention, there is provided a process for recovering hydrogen in both high purity and high yield and normally liquid hydrocarbon vapors from a feed gas mixture containing hydrogen, at least one heavier gas and normally liquid hydrocarbon vapors which comprises:

Directing said feed gas mixture to a guard adsorber of a selective adsorption unit, adsorbing vapors of normally liquid hydrocarbons thereon, directing said feed gas mixture to a selective adsorber of said selective adsorption unit, obtaining a high purity hydrogen product from said selective adsorption unit, obtaining from said selective adsorption unit a purge gas, directing said purge gas from the selective adsorption unit to a membrane permeator selectively permeable to hydrogen, recovering a permeated hydrogen gas of improved purity from said permeator, purging said guard adsorber with said permeated hydrogen gas and blending the second purge gas comprising purged vapors of normally liquid hydrocarbon with said feed gas mixture. The normally liquid hydrocarbon vapors are recovered by condensation and separation and the hydrogen is recovered by means of said selective adsorption unit.

A non-permeated gas mixture consisting predominantly of said heavier gas or gases is separated by the membrane permeator and is recovered for other use or disposed of as desired. If this non-permeated gas mixture is disposed of in the preferred manner of controlled flaring or used as auxiliary fuel gas or in another process no environmentally undesirable gases or vapors are released from the improved process.

The invention has the advantage of recovering a high yield, frequently 90% or greater, of the desired high purity hydrogen product and concurrently providing for the recovery of substantial values of reactant or product normally lost as vapors rejected by the selective adsorption processes of the prior art. Additionally, such added recoveries of hydrogen and hydrocarbon vapors can be accomplished while minimizing the release from the improved process of any environmentally undesirable gaseous products. A further advantage is the fact that the process of the present invention can be carried out with selective adsorption units already in place or in use by addition of a system for improved gas recovery comprising a membrane permeator unit and related equipment. In this way the existing selective adsorption units afford both a substantially increased yield of hydrogen and can be rendered environmentally acceptable by the elimination of the release of polluting gases. The increased cost of fuel, both as potential source of hydrogen and for the generation of process energy make the increased recovery of hydrogen without the necessity to totally replace previously used lower yielding units very attractive in the petrochemical and refining industries. Likewise, the ability to terminate the release of polluting gases and vapors by use of the present invention employing such existing selective adsorption units is both environmentally advantageous and economically attractive.

BRIEF DESCRIPTION OF THE DRAWING

FIG. 1 is a schematic process flow diagram illustrating the present invention.

DESCRIPTION OF THE PREFERRED EMBODIMENTS

As feed gas mixture to the present process there can be employed any gas mixture containing a substantial proportion of hydrogen which is desired to be recovered in relatively highly pure form, as well as vapor of a normally liquid hydrocarbon. Such streams may be derived from processes in which hydrogen is a reactant or product as hydrogenations, hydrocarbon syntheses, dehydrogenations, both catalytic and thermal, condensation reactions with hydrogen as a by-product, controlled combustion or reforming of hydrocarbons and cracking of hydrocarbons, both catalytic or thermal, with hydrogen as a product gas. A normally liquid hydrocarbon is frequently present in such processes as a reactant, product or by-product thereof. Such normally liquid hydrocarbons may be broadly aliphatic or aromatic. They include such aliphatic hydrocarbons as pentane, isopentane, hexane, cyclohexane and higher-boiling aliphatic hydrocarbons and aromatic hydrocarbons generally, such as benzene, toluene and xylene. Generally a vent or by-product hydrogen-containing gas mixture will have been separated from liquid reactants and/or products of the process from which the stream is generated, but vapors of such normally liquid materials will be present up to saturation under existing conditions of temperature and pressure.

Frequently, the vent or by-product gas mixture is collected in a surge or holding tank to eliminate fluctuations and provide a steady supply. If not at the desired elevated pressure the mixture is brought to the pressure desired for the selective adsorption or pressure swing adsorption process. Any entrained or condensed liquid hydrocarbons or other reactants, products or impurities condensed as a result of changes in pressures and line temperature drops are commonly removed by means of a liquid knock-out tank, a coalescing separator or a combination of such liquid removal means. The normally liquid hydrocarbons so condensed and separated are returned to the appropriate point in the process from which generated for recovery or reuse. Impurities and non-hydrocarbons which may be present as liquids are removed and disposed of.

The feed gas mixture is directed to the selective adsorber or pressure swing adsorber at an elevated pressure, generally from about 3.4 to 54.4 atmospheres (50 to 800 psi) and preferably from about 20.4 to 34.0 atmospheres (300 to 500 psi). These selective adsorption units generally operate satisfactorily at ambient temperatures and such temperatures are satisfactory in the present process. If a heated gas is to be recovered it is frequently desirable to cool such gas below 100° C. and preferably below 50° C. prior to recovery of its hydrogen content.

Referring to FIG. 1 a feed gas mixture is directed by conduit 1 to surge tank 2 which supplies compressor 3. From compressor 3 the compressed feed gas mixture is directed first to knock-out tank 4 for separation of any condensed liquids. These are eliminated from the tank 4 by conduit 6 for heavier liquids such as incidental water and water miscible liquids and conduits 7 and 8 for liquid hydrocarbons, which can be recycled to the process from which the feed stream was derived. From tank 4 the feed stream is directed to coalescing separator 5 to remove any droplets of hydrocarbon present and recycle such liquid hydrocarbons also via conduit 8.

Generally the feed gas mixture to the present described process will be available at low pressure such that a higher pressure will be desired for supplying the selective adsorption process. Therefore, compression of the feed gas mixture is usually provided. It will be apparent that when the feed gas mixture is available at the desired or a higher pressure then compressor 3 and the associated knock-out tank 4, coalescing separator 5 and conduits 6, 7 and 8 will not be required for bringing such feed gas mixture to such desired pressure. In that instance, however, the second purge gas directed from the guard adsorber 10 via conduit 28 will require compression prior to blending it with the higher pressure feed gas mixture. Also a knock-out tank, coalescing separator or other means of separating and recovering condensed liquid hydrocarbon vapors from the second purge gas stream will be needed. For convenience, the more generally encountered arrangement of these compression and separation devices is illustrated in FIG. 1.

The feed gas mixture freed of condensed liquids is directed by conduit 9 to a selective adsorption unit represented schematically by a single guard adsorber 10 and a single primary selective adsorber 12 and associated conduits 11, 13 and 14. Guard adsorber 10 adsorbs any normally liquid hydrocarbons still in vapor form and some water vapor and essentially all vapors of water-miscible liquids which may be present in the feed gas stream. The primary selective adsorber 12 selectively adsorbs the gases heavier than hydrogen. A high purity hydrogen product is produced as effluent gas from the selective adsorption unit and is directed to storage or use as desired by conduit 13. It is the combined effluent of purified hydrogen from each of the plurality of primary selective adsorbers.

When the adsorption bed of primary selective adsorber 12 is loaded as desired the feed mixture in conduit 9 is switched to another pair of the plurality of guard adsorbers and primary selective adsorbers for adsorption by that other pair of adsorbers. Thereupon primary selective adsorber 12 and usually guard adsorber 10 require regeneration. Regeneration of guard adsorber 10 is detailed below. The purified void space hydrogen in adsorber 12 is generally recovered by lowering the pressure on the exit in the direction of flow of the adsorption step to direct a portion of the purified void space hydrogen to one of the other parallel selective adsorbers for repressurization of that other adsorber and a second portion to another parallel selective adsorber for partial or complete purging of that adsorber. Adsorber 12 then requires desorption of adsorbed gases, purging and repressurization.

Desorption, or blowdown, is generally accomplished by adjusting to a lower pressure at the inlet for normal flow, i.e., the gas flow is countercurrent to normal flow, and passing the desorbed gases, the residue of void space hydrogen and the residue of charged feed gas out of adsorber 12 and via conduit 15 for disposal or further treatment. It is generally preferred to direct the desorbed gases from adsorber 12 into the same header and thence into conduit 15 which takes the flow of purge gas from that adsorber. Operation in this manner will ensure that all the desired product hydrogen present in adsorber 12 at the commencement of desorption will be directed to the membrane permeator unit for potential recovery. Adsorber 12 is then purged, usually at the same or a lower pressure by means of a purging gas of substantially purified hydrogen product.

The purging gas comprising substantially purified hydrogen can comprise a portion of the product hydrogen stream from any adsorber then carrying out adsorption or from a collecting manifold or header for such product stream. It can comprise a substantially purified hydrogen from an external source such as storage or another process. Purging gas can also comprise a portion of the substantially purified void space hydrogen from another primary selective adsorber in the well known manner of the prior art. When such void space hydrogen is used as purging gas for adsorber 12 it is generally taken from the product outlet of another adsorber, i.e., in a flow direction cocurrent with the flow of product gas during the adsorption of such other adsorber. Conduit 14 constitutes a schematic illustration of the means to direct such purging gas to adsorber 12 from whichever of the above sources is desired.

In the selective adsorption or pressure swing adsorption processes of the prior art it is generally preferred to reduce the purging gas to a very low pressure, whether that gas is a portion of the hydrogen product stream, a portion of the void space hydrogen, or from an external source, in order to facilitate desorption of the adsorbed gases and to decrease the proportion of hydrogen required as purging gas stream. Pressure reduction by any convenient means can be carried out in the present process. Since a very large proportion of the purging gas hydrogen is recovered, however, it is not essential that such pressure reduction of the purging gas be carried to the same extent to minimize use of hydrogen as purging gas as in the prior processes. Thus the primary selective adsorber to be purged can be reduced in pressure in one or more steps to desorb a portion of the adsorbed heavier gases and the hydrogen purging gas can be admitted to sweep out the remainder at the last such pressure or any further reduced pressure by adjusting the flow rate of the purging gas stream. In contrast to some selective adsorption processes of the prior art no additional hydrogen is required for purging and regeneration of the guard adsorbers, such regeneration being accomplished in this process by use of a permeated recovered hydrogen gas from the membrane permeator unit, as more fully described below.

The purge gas, preferably joined with the desorbed gases, forms the regenerating gas stream which is subjected to separation by the membrane permeator unit 20. The term "regenerating gas" embraces both the purge gas alone if the desorbed gases are separately disposed of, and the joined purge gas and desorbed gases, as is preferred. It is desirable to initially direct the regenerating gas to a holding tank 16, since each cycle of each adsorber will cause the pressure to vary over a wide range which can extend from as low as atmospheric up to pressures approaching that of the product gas, and such surges and drops in pressure are advantageously damped for further processing. Therefore a regenerating gas holding tank 16 of a capacity suitable to accommodate the desorbed gases, or blowdown, and purge gas from the multiple primary selective adsorbers is provided. The gas holding tank 16 is normally maintained at approximately the lowest pressure of the purge gas. When desorption and purging of the selective adsorbers is carried out at a final pressure of about 3 atmospheres or greater the regenerating gas can be separated and the hydrogen content recovered by membrane permeator unit 20 and the permeated hydrogen gas recycled to the guard adsorbers without additional compression. When operating in such manner the compressor 17 and high pressure holding tank 19 are not essential. Such a manner of operation is contemplated within the present invention.

In order to provide for the most efficient separation of the regenerating gas and utilization of the permeated hydrogen gas it is usually preferred to bring the regenerating gas to a higher pressure such as by means of compressor 17. The compressor 17, which can be an automatic loading/unloading compressor to accommodate periods of low or no flow of gas from the holding tank 16, is designed to repressure the regenerating gas for separation and recovery of the hydrogen content and recycle of the permeated hydrogen to the guard adsorbers of the selective adsorption unit. The regenerating gas is repressured to an elevated pressure of from about 3 to 50 atmospheres (45 to 735 psi) or higher, and preferably from about 5 to 35 atmospheres (75 to 515 psi), and passed to a high pressure holding tank or surge tank 19. The high pressure holding tank 19 is suitably sized to accommodate periods of low or no input gas flow from the compressor 17 and to supply a relatively continuous flow of repressured regenerating gas to the membrane permeator unit 20. It is frequently desirable to provide an oil removal filter, not shown, in line 18 from the compressor 17 to the high pressure holding tank 19 to insure that the repressurized regenerating gas stream is not contaminated with entrained oil from the system. Often it is also desirable to incorporate a filter for particulate matter, not shown, before the compressor 17 to remove any solids which might be present.

The membrane permeator unit 20 provides for separation of a substantial proportion of the hydrogen gas present in a regenerating gas from the heavier gases also present. The nature of such heavier gases will vary depending upon the source of the mixed gas feed to the present process. The heavier gases can comprise one or more of nitrogen, carbon monoxide, carbon dioxide, methane, ethane and traces of higher, normally liquid hydrocarbons, aliphatic or aromatic, which were not adsorbed in the guard adsorbers. The membrane permeator unit 20 is provided with permeable membranes selectively permeable to hydrogen in preference to the heavier gases.

The membrane unit 20 consists of one or more permeators comprising semipermeable membranes mounted in a suitable housing and provided with manifolds and associated with an inlet and separate outlets for non-permeated and permeated gas streams. Desirably the permeators take the form of hollow fiber permeators wherein the fibers are mounted in a shell which is provided with an inlet and outlets and manifolded so that the regenerating gas under pressure is supplied either to the bores of the fibers or, more preferably, to the outside or shell side of the hollow fiber membranes. The non-permeated gas mixture is withdrawn from manifolds at the opposite ends of the fiber bores or of the shell and the permeated gas is withdrawn from the opposite fiber surfaces, i.e., from the fiber bores if the regenerating gas is fed to the shell. Most desirably the hollow fiber membrane permeators will provide for shell side axial or radial flow of the regenerating gas feed with removal of the non-permeated gases from a remote point of the shell and recovery of the permeated gas from the bores of the fibers. Either cocurrent or counter-current flow of the regenerating gas feed and hydrogen-rich permeated gas can be employed, with counter-current flow usually being preferred.

Generally the selectivity or separation of a membrane is described in terms of the ratio of the permeability of the fast permeating gas, i.e., hydrogen to the permeability of the slower permeating gas, such as carbon monoxide or methane, wherein the permeability (P/1) of the particular gas through the membrane can be defined as the volume of gas at standard temperature and pressure which passes through the membrane per square centimeter of separating surface area per second for a partial pressure drop of one centimeter of mercury across the membrane. The ratio of the permabilities of the two specific gases is referred to as the separation factor of the first gas in respect to the second gas (S.F.H$_2$/CO or $\alpha$H$_2$/CO). Desirably, the separation factor for hydrogen over carbon monoxide or methane will be at least 5 and preferably at least about 10. Separation factors for hydrogen over carbon monoxide or methane of 50 or 100 or greater may be provided by certain membranes. Particularly desirable membranes exhibit hydrogen permeabilities of at least $1 \times 10^{-6}$ and preferably from $1 \times 10^{-5}$ to $4 \times 10^{-4}$ cubic centimeters of hydrogen per square centimeter of membrane surface area per second at a partial pressure drop of one centimeter of mercury across the membrane.

The partial pressure differential of hydrogen across the membrane provides the driving force for the permeation of hydrogen and depends upon the concentration of hydrogen as well as the total gas pressures on each side of the membranes. Generally, the regenerating gas will be supplied to the permeator unit at a pressure of from about 3 to 50 atmospheres. Preferably, the regenerating gas will be supplied at a pressure of about 5 to 35 atmospheres. The pressure on the recovered permeated gas generally will range from 0.1 to 45 atmospheres, and preferably from about 1.5 to 10 atmospheres. Thus, the differential in pressure maintained between the non-permeated gas mixture and the permeated stream on the opposite side of the membranes may range from about 2 to 49 atmospheres and preferably will range from about 5 to 22 atmospheres.

The membrane permeator unit 20 provides two effluent gas mixtures, the permeated gas removed by conduit 24 and comprising a relatively pure stream of recovered hydrogen gas and the non-permeated gas mixture removed by conduit 22 and comprising a small proportion of the hydrogen and the great preponderance of the heavier gases desorbed from the primary selective adsorbers and traces of any normally liquid aliphatic or aromatic hydrocarbons not removed by the guard adsorbers. The latter non-permeated gas mixture is suitable for use in any convenient process, for fuel gas or for disposal by flaring or venting. It may be conveniently reduced in pressure by a pressure reduction means 23 and directed to any desired use or to flaring via conduit 21. This non-permeated gas mixture is a small fraction of the volume of the gases normally directed to disposal from a conventional selective adsorption process. In the process of the present invention the preferred means of disposal of the nonpermeated gas mixture is burning, either by controlled flaring or more preferably as fuel. In this manner the carbon monoxide, methane or other low molecular weight hydrocarbon and hydrogen present therein are converted to carbon dioxide and water and no polluting gases are released.

The permeated or recovered hydrogen gas often comprising hydrogen of greater than 90 percent and frequently greater than 95 percent purity is suitable for use as purging gas for the guard adsorbers and subsequent recovery as product. For such use the permeated hydrogen gas need not be at a substantially high pressure. Hence, it may conveniently be collected in a low pressure holding tank 25 at from about 1.5 to 5 atmospheres and directed sequentially via conduit 26 to the guard adsorbers such as guard adsorber 10 for regeneration thereof. The permeated hydrogen gas as second purge gas serves to desorb and sweep out the normally liquid hydrocarbons originally adsorbed on the guard adsorbent as vapors and to regenerate the guard adsorbers for succeeding cycles.

The second purge gas is directed via conduit 28 from the guard adsorbers to blend with the feed gas mixture, desirably by passing said purge gas to the surge or holding tank 2 for the vent or by-product gas mixture comprising the feed gas mixture. In this manner the recovered hydrogen of the second purge gas is available as added feed gas mixture and is recovered as additional hydrogen product by the selective adsorption unit. Thus the yield of the desired purified hydrogen product is maximized.

The normally liquid hydrocarbon vapors present in the second purge gas are condensed, coalesced and recovered by the compressor 3, knock-out tank 4 and coalescing separator 5 or like means for separation and recovery of liquified hydrocarbons. In this manner there is recovered a substantial quantity of such hydrocarbons for recycle and reuse in the process generating the vent or by-product gas mixture. The content of vapors of normally liquid hydrocarbons in the feed gas mixture to the selective adsorption unit is again reduced to saturation value at the pressure of the compressed feed gas mixture. By recovery and recycle of such normally liquid hydrocarbons the release of such hydrocarbons into the environment is avoided. Thus, the present improved process is environmentally acceptable.

Any suitable material selectively permeable to hydrogen, in favor of the heavier gases such as carbon monoxide, methane, nitrogen and other gases may be employed for the separation membranes and the preferred hollow fiber separation membranes. Suitable membrane materials include metallic and inorganic membranes as well as organic polymers or organic polymers mixed with inorganics such as fillers, reinforcements and the like. Typical organic polymers which are suitable for the formation of planar and hollow fiber membranes can be substituted or unsubstituted polymers and may be selected from polysulfones; polystyrenes, including styrene-containing polymers such as acrylonitrilestyrene copolymers, styrene-butadiene copolymers and styrene-vinylbenzyl halide copolymers; polycarbonates; cellulosic polymers, such as cellulose acetate, cellulose acetate-butyrate, cellulose propionate, ethyl cellulose, methyl cellulose, nitro cellulose, etc.; polyamides and polyimides, including aryl polyamides and aryl polyimides; polyethers, polyarylene oxides, such as polyphenylene oxide and polyxylylene oxide; polyesteramidediisocyanates; polyurethanes; polyesters, including polyacrylates, such as polyethylene terephthalate, polyalkyl methacrylates, polyalkyl acrylates, polyphenylene terephthalate, etc.; polysulfides; polymers from monomers having α-olefinic unsaturation other than mentioned above such as polyethylene, polypropylene, polybutene-1, poly-4-methylbutene-1, polyvinyls, e.g., polyvinylchloride, polyvinylfluoride, polyvinylidene chloride, polyvinyidene fluoride, polyvinyl alcohol, polyvinyl esters such as polyvinyl acetate and polyvinyl propionate, polyvinyl pyridines, polyvinyl pyrrolidones, polyvinyl ethers, polyvinyl ketones, polyvinyl aldehydes such as polyvinyl formal and polyvinyl butyral, polyvinyl amines, polyvinyl phosphates and polyvinyl sulfates; polyallyls; polytriazoles; polybenzimidazoles, polycarbodiimides; polyphosphazines; etc., and interpolymers including block interpolymers containing repeating units from the above such as terpolymers of acrylonitrile-vinylbromidesodium salt of p-sulfophenylmethallyl ether; and grafts and blends containing any of the foregoing. Typical substituents providing substituted polymers include halogens such as fluorine, chlorine and bromine, hydroxyl groups, lower alkyl groups, lower alkoxy groups, monocyclic aryl, lower acyl groups and the like.

The membrane material is preferably as thin as possible in order to improve the rate of permeation through the membrane, yet of sufficient thickness to insure adequate strength to the membrane to withstand the separation conditions, including differential pressures and differential partial pressures employed. Membranes and hollow fiber membranes may be isotropic, i.e., have substantially the same density throughout, or they may be anisotropic, i.e., having at least one zone of greater density than at least one other zone of the fiber membranes. The membranes may be chemically homogeneous, i.e., constructed of the same material, or they may be composite membranes. Suitable composite membranes may comprise a thin layer which effects the separation on a porous physical support which provides the necessary strength to the composite membrane to withstand the separation. Particularly preferred composite membranes are the multicomponent membranes disclosed by Henis et al in United States patent application No. 832,481, filed Sept. 13, 1977 and commonly assigned. These membranes comprise a porous separation membrane which substantially effects the separation and a coating material in occluding contact with the porous separation membrane within the material of the coating does not substantially effect the separation. These multicomponent membranes are particularly attractive for gas separations wherein hydrogen is separated from carbon monoxide, methane, nitrogen and other heavier gases in that good selectivity for separation and high flux of hydrogen through the membranes can be obtained.

The materials for coating of these multicomponent membranes may be natural or synthetic substances, and are often polymers, which advantageously exhibit the appropriate properties to provide occluding contact with the porous separation membrane. Synthetic substances include both addition and condensation polymers. Typical of the useful materials which can comprise the coating are polymers which can be substituted or unsubstituted and which are solid or liquid under gas separation conditions, and include synthetic rubbers; natural rubbers; relatively high molecular weight and/or high boiling liquids; organic prepolymers, polysiloxanes; silicone polymers; polysilazanes, polyurethanes; polyepichlorohydrins; polyamines; polyimines; polyamides including polylactams; acrylonitrile-containing copolymers such as poly (α-chloroacrylonitrile) copolymers; polyesters including polyacrylates, e.g., polyalkyl acrylates and polyalkyl methacrylates, wherein the alkyl groups have from 1 to about 8 carbon atoms, polysebacates, polysuccinates, and alkyd resins; terpenoid resins; linseed oil; cellulosic polymers; polysulfones, especially aliphatic-containing polysulfones; polyalkylene glycols such as polyethylene glycol, polypropylene glycol, etc.; polyalkylene polysulfates; polypyrrolidones; polymers from monomers having olefinic unsaturation such as polyolefins, e.g., polyethylene, polypropylene, polybutadiene, poly(2,3-dichlorobutadienes), polyisopropene, polychloroprene, polystyrene, including polystyrene copolymers, e.g., styrene-butadiene copolymers, polyvinyls such as polyvinyl alcohol, polyvinyl aldehydes, e.g., polyvinyl formal and polyvinyl butyral, polyvinyl ketones, e.g., polymethylvinyl ketone, polyvinyl esters, e.g., polyvinyl benzoates, polyvinyl halides, e.g., polyvinyl bromide, polyvinylidene halides, polyvinylidene carbonates, poly(n-vinylmaleamide), etc., poly(1,5-cyclooctadiene), poly(methylisopropenyl ketone), fluorinated ethylene copolymers, polyarylene oxides, e.g., polyxylylene oxides, polycarbonates; polyphosphates, e.g., polyethylene methyl phosphate; and the like, and any interpolymers including the interpolymers containing repeating units from the above, and grafts and blends containing any of the foregoing. The materials may or may not be polymerized after application to the porous separation membrane.

In the examples which follow the invention is illustrated by application to a vent gas mixture from a benzene condensation process in which hydrogen is a by-product. The mixture contains predominantly hydrogen with lesser amounts of carbon monoxide and methane and is saturated with benzene vapor. A portion of the hydrogen was recovered by a conventional cyclic pressure selective adsorption unit having four primary selective adsorbers with a guard adsorber before each primary adsorber. The selective adsorption unit included an associated surge tank and compressor for the feed gas mixture followed by a knock-out tank and a coalescing separator for the removal of liquids, predominantly benzene, from the feed gas mixture. The process of the present invention is applicable to any vent or purge stream containing other normally liquid aromatic or aliphatic hydrocarbon vapors and is an environmentally acceptable and efficient process for the recovery of hydrogen.

EXAMPLE 1

The purged regenerating gas from a selective adsorption unit comprising the desorbed heavier gases and hydrogen purge gas from four primary adsorbers operating sequentially was split into two portions. The major portion was directed to venting. A small slip stream was collected in a holding tank at about 2.4 atmospheres. A stream of this regenerating gas was taken from the holding tank and directed to a permeator at ambient temperatures, which varied from about 0° to 25° C. The gas stream was raised to a sufficient pressure to maintain a pressure differential across the permeator of from about 8.5 to 20.4 atmospheres (125 to 300 psi). The permeator separated a substantial proportion of the hydrogen content of the regenerating gas as a permeated hydrogen gas while rejecting a substantial proportion of the carbon monoxide and methane content as a non-permeated gas mixture. The permeated hydrogen gas was suitable for use as purge gas to the guard adsorbers of the selective adsorption unit and for recovery by recycle to the surge tank supplying the selective adsorption unit.

The permeator contained poly(siloxane)-coated anisotropic polysulfone hollow fiber membranes prepared substantially in accordance with the method disclosed in Example 64 of United States Ser. No. 832,481, filed Sept. 13, 1977 of Henis et al from polysulfone having a molecular weight in excess of 10,000 and a poly(siloxane) having a molecular weight in excess of 1,000 prior to crosslinking. The polysulfone hollow fiber porous separation membranes, which were coated on the outside surface with poly(siloxane) in occluding contact with such surface, had an outside diameter of approximately 500 microns, an inside diameter of approximately 250 microns and a wall thickness of approximately 125 microns. The membranes in the permeator had an effective surface area of approximately 5500 square centimeters. The regenerating gas was contacted with the outer surfaces of the membranes in axial flow and the permeated gas withdrawn from the bores of the hollow fibers.

The permeabilities of the three major gases present in the regenerating gas were determined in a series of measured runs extended over a period of three months of total operation of the permeator on this regenerating gas. The test runs were conducted at pressure differentials of from 8.5 to 13.6 atmospheres and ambient temperatures of from 0° to 20° C. The permeabilities determined were normalized to a 20° C. temperature by extrapolating the measured values. The effective permeabilities determined for each gas in a series of test runs expressed in P/l (gas)×$10^6$ at 20° C. and separation factor expressed as $\alpha H_2$/gas are set out in Table 1A below. It is apparent that a permeated gas substantially concentrated in hydrogen and substantially reduced in carbon monoxide and methane content was produced.

TABLE 1A

| | Permeabilities and Separation Factors at 20° C. | | | | |
|---|---|---|---|---|---|
| Run | (P/l) $H_2 \times 10^6$ | (P/l) $CO \times 10^6$ | $\alpha_{CO}{}^{H_2}$ | (P/l) $CH_4 \times 10^6$ | $\alpha_{CH_4}{}^{H_2}$ |
| A | 47.8 | 1.51 | 31.6 | 1.48 | 32.1 |
| B | 55.1 | 1.93 | 28.6 | .96 | 57.4 |
| C | 61.3 | 1.78 | 34.4 | 1.41 | 43.5 |
| D | 58.5 | 2.23 | 26.2 | 2.00 | 29.2 |
| E | 63.9 | 2.85 | 22.4 | 2.52 | 25.3 |
| F | 45.5 | 1.48 | 30.7 | 1.15 | 39.6 |
| G | 42.7 | 1.55 | 27.6 | 1.09 | 39.2 |
| H | 49.4 | 1.48 | 33.4 | 1.05 | 47.0 |

Prior to placing on stream and after three months of operation on the regenerating gas the same hollow fiber permeator was tested with each of hydrogen and carbon monoxide gases separately. The permeabilities (P/l) of each gas, the percent change in P/l, and the separation factor ($\alpha H_2$/CO) of hydrogen in respect to carbon monoxide before and after the test period as determined with the separate pure gases are set out in Table 1B below. It is apparent that although the permeabilities to the individual gases had been reduced by approximately 25 percent by three months of operation the performance as determined by separation factor was essentially unchanged.

TABLE 1B

| | Permeabilities and Separation Factor at 30° C. | | |
|---|---|---|---|
| | Prior to Test | After Test | % Change |
| (P/l)$H_2 \times 10^6$ | 80.0 | 58.8 | −26.6 |
| (P/l)$CO \times 10^6$ | 2.20 | 1.65 | −25.0 |
| $\alpha_{CO}{}^{H_2}$ | 36.4 | 35.6 | — |

EXAMPLE II

The vent gas from a hydrogen-generating reaction of benzene from which liquid reactant and products have been condensed is collected in a surge tank and passed to a compressor for compression to approximately 21.4 atm. (315 psia). This feed gas mixture is passed through a knock-out tank to remove condensed benzene and incidental water and then through a coalescing separator to coalesce any benzene droplets. The separated benzene liquids are returned to the hydrogen generating reaction and the water directed to sewer. The feed gas mixture saturated with benzene vapor is directed to a guard adsorber and thence to a primary selective adsorber of the selective adsorption unit of four guard and primary selective adsorbers operating sequentially. The selective adsorption unit described above is operated so as to recover high purity hydrogen gas containing less than 25 ppm each of carbon monoxide and methane from the vent gas of the hydrogen generating reaction. When thus operating the conventional selective adsorption unit, approximately 576 Standard Cubic Meters (20200 SCF) of the feed gas mixture is processed to separate and forward for use in another process 45.5 kg (100 pounds) of hydrogen as 510 SCM (17900 SCF) of purified gas. The composition is determined and shown in Table 2 of the regenerating gas produced by desorbing and purging of the primary selective adsorbers, expressed as kg. of each named constituent per each 45.4 kg. of purified hydrogen produced by the selective adsorption unit.

Using a selective adsorption system as illustrated in FIG. 1 the compositions expressed as above of a recovered permeated hydrogen gas, of the permeated hydrogen stream after use as purge gas for the guard adsorbers and of a non-permeated gas mixture for disposal are determined based upon computer calculations when employing a membrane permeator unit composed of identical hollow fiber membranes to those described in Example I. The membrane permeator unit comprises two parallel permeators each having a surface area of approximately 93 square meters for a total surface area of approximately 186 square meters. The regenerating gas is collected in a low pressure holding tank at about 2.4 atmospheres, compressed to approximately 21 atmospheres and then passed through the permeator unit at a temperature of from 20° to 30° C. The differential in pressure between the compressed regenerating gas and the permeated gas is maintained at about 13.6 atmospheres. The recovered permeated hydrogen gas comprising 97.1 Vol. percent hydrogen is collected in a low pressure holding tank at about 3.4 atm. and directed to the guard adsorbers sequentially as purge gas. From the guard adsorbers this second purge gas is passed to the surge tank and blended with fresh feed gas mixture therein. The non-permeated gas mixture from the permeator is blended with general process fuel gas in a fuel gas header and subsequently burned as fuel. The compositions of the regenerating gas, the recovered permeated hydrogen gas, the purge gas from the guard adsorbers and the non-permeated gas mixture in kg. per 45.4 kg. of hydrogen product are set out in Table 2 below.

TABLE 2

| Compositions of Gas Streams, kg. | | | |
|---|---|---|---|
| | Regenerating Gas | Permeated Gas | Purge Gas (from Guard Adsorbers) | Non-Permeated Gas |
| $H_2$ | 22.7 | 20.3 | 20.3 | 2.39 |
| CO | 23.4 | 3.62 | 3.62 | 19.81 |
| $CH_4$ | 24.3 | 2.83 | 2.83 | 21.48 |
| Benzene | — | — | 32.8 | — |

The additional 20.3 kg. of hydrogen recovered by the selective adsorption unit as additional purified hydrogen product represents an increase from the conventional 45.4 kg. to 65.7 kg. or a 44.7% increase in yield of highly purified hydrogen gas. It also represents approximately a 90% yield of high purity hydrogen based on the hydrogen content of the feed gas mixture. The 32.8 kg. of benzene recovered represents a substantial recovery of reactant which is recycled to the hydrogen-generating benzene condensation process and is not released to the environment. Burning of the non-permeated gas mixture as fuel gas also eliminates release of carbon monoxide and methane to the environment.

What is claimed is:

1. In a selective adsorption process wherein a feed gas mixture containing hydrogen, at least one heavier gas and vapors of at least one normally liquid hydrocarbon is directed to a guard adsorber of a selective adsorption unit, vapors of normally liquid hydrocarbons are adsorbed by said guard adsorber, said feed gas mixture substantially freed of said vapors is thereafter directed to a selective adsorber of said selective adsorption unit, a hydrogen product is obtained from said selective adsorption unit and a first purge gas comprising hydrogen is obtained from said selective adsorption unit, the improvement comprising directing said first purge gas to a membrane permeator selectively permeable to hydrogen, recovering from said permeator permeated gas comprising hydrogen, sequentially directing said permeated gas to said guard adsorber, purging said guard adsorber with said permeated gas of at least a portion of said adsorbed vapors, blending the resulting second purge gas from the guard adsorber with said feed gas mixture and recovering at least a portion of said normally liquid hydrocarbon.

2. The process of claim 1 wherein a portion of said vapors purged from the guard adsorber are recovered as liquid hydrocarbon.

3. The process of claim 2 wherein said vapors are recovered by condensing and coalescing same.

4. The process of claim 1 wherein said first purge gas is directed to said membrane permeator at an elevated pressure of from about 3 to about 50 atmospheres.

5. The process of claim 4 wherein said first purge gas is compressed to said elevated pressure.

6. The process of claim 1 wherein at least one desorbed heavier gas and said first purge gas are mixed, and said gas mixture is directed to said membrane permeator.

7. The process of claim 1 wherein said heavier gas comprises at least one of carbon monoxide and methane.

8. The process of claim 1 wherein said normally liquid hydrocarbon comprises at least one of an aliphatic or aromatic hydrocarbon.

9. The process of claim 8 wherein said normally liquid hydrocarbon comprises benzene.

10. The process of claim 1 wherein said membrane permeator is comprised of multicomponent hollow fiber membranes.

11. The process of claim 10 wherein said multicomponent hollow fiber membranes comprise a porous hollow fiber separation membrane and a coating in occluding contact with the outside surface thereof.

12. The process of claim 11 wherein said porous hollow fiber separation membrane comprises polysulfone and said coating comprises poly(siloxane) crosslinked to provide a silicone rubber.

13. The process of claim 1 wherein a non-permeated gas mixture is recovered from said membrane permeator.

14. The process of claim 13 wherein said non-permeated gas mixture is burned.

15. In a selective adsorption process wherein a feed gas mixture containing hydrogen, at least one heavier gas and vapors of at least one normally liquid hydrocarbon is directed to a guard adsorber of a selective adsorption unit, said vapors are adsorbed by said guard adsorber, said feed gas mixture substantially freed of said vapors is thereafter directed to a selective adsorber of said selective adsorption unit, a hydrogen product is obtained from said selective adsorption unit and at least one desorbed heavier gas and purge gas are joined in a regenerating gas obtained from said selective adsorption unit, the improvement comprising directing said regenerating gas to a membrane permeator selectively permeable to hydrogen, recovering from said permeator a permeated gas comprising hydrogen, sequentially directing said permeated gas to said guard adsorber, purging said guard adsorber with said permeated gas of at least a portion of said adsorbed vapors, blending the resulting second purge gas from the guard adsorber with said feed gas mixture and recovering at least a portion of said normally liquid hydrocarbon.

16. The process of claim 15 wherein said regenerating gas is directed to said membrane permeator at an elevated pressure of from about 3 to about 50 atmospheres.

17. The process of claim 16 wherein said regenerating gas is compressed to said elevated pressure.

18. The process of claim 15 wherein a portion of said vapors purged from the guard adsorber are recovered as liquid hydrocarbon.

19. The process of claim 18 wherein said vapors are recovered by condensing and coalescing same.

20. The process of claim 15 wherein said heavier gas comprises at least one of carbon monoxide and methane.

21. The process of claim 15 wherein said normally liquid hydrocarbon comprises at least one of an aliphatic or aromatic hydrocarbon.

22. The process of claim 21 wherein said normally liquid hydrocarbon comprises benzene.

23. The process of claim 15 wherein a non-permeated gas mixture is recovered from said membrane permeator.

24. The process of claim 23 wherein said non-permeated gas mixture is burned.

25. The process of claim 15 wherein said membrane permeator is comprised of multicomponent hollow fiber membranes.

26. The process of claim 25 wherein said multicomponent hollow fiber membranes comprise a porous hollow fiber separation membrane and a coating in occluding contact with the outside surface thereof.

27. The process of claim 26 wherein said porous hollow fiber separation membrane comprises polysulfone and said coating comprises poly(siloxane) crosslinked to provide a silicone rubber.

* * * * *